United States Patent
Klein et al.

(10) Patent No.: US 11,577,679 B2
(45) Date of Patent: Feb. 14, 2023

(54) DETECTION OF AN IMPACT EVENT

(71) Applicant: Robert Bosch GmbH, Stuttgart (DE)

(72) Inventors: Martin Klein, Brackenheim (DE);
Armin Koehler, Sachsenheim (DE);
Klaus Heyer, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 17/045,309

(22) PCT Filed: Jun. 4, 2019

(86) PCT No.: PCT/EP2019/064449
§ 371 (c)(1),
(2) Date: Oct. 5, 2020

(87) PCT Pub. No.: WO2019/233993
PCT Pub. Date: Dec. 12, 2019

(65) Prior Publication Data
US 2021/0146866 A1 May 20, 2021

(30) Foreign Application Priority Data
Jun. 5, 2018 (DE) .......................... 102018208831.4

(51) Int. Cl.
*B60R 21/0134* (2006.01)
*H04W 4/40* (2018.01)
(Continued)

(52) U.S. Cl.
CPC ...... *B60R 21/0134* (2013.01); *B60R 21/0136* (2013.01); *B60W 30/09* (2013.01);
(Continued)

(58) Field of Classification Search
CPC ........... B60R 21/0134; B60R 21/0136; B60W 2756/10; B60W 30/09; B60W 30/0956; H04W 4/40
See application file for complete search history.

(56) References Cited

U.S. PATENT DOCUMENTS

2003/0100983 A1* 5/2003 Bullinger ............ B60R 21/0134
340/436
2007/0106474 A1 5/2007 Ide
(Continued)

FOREIGN PATENT DOCUMENTS

DE 10049911 A1 4/2002
DE 10323483 A1 12/2004
(Continued)

OTHER PUBLICATIONS

International Search Report for PCT/EP2019/064449, dated Aug. 26, 2019.

*Primary Examiner* — Peter D Nolan
*Assistant Examiner* — Tarek Elarabi
(74) *Attorney, Agent, or Firm* — Norton Rose Fulbright US LLP; Gerard Messina

(57) ABSTRACT

A method for a vehicle, in particular a vehicle which is operated in an at least partially automated manner, for detecting an impact event. The method includes of:
a. developing a driving environment model for the vehicle as a function of first sensor signals from at least one driving environment sensor system of the vehicle; b. using the driving environment model to determine a probability of contacting an object; c. opening a measurement window for second signals of a contact sensor system as a function of the determined contact probability; d. detecting an impact event as a function of the second sensor signals, in particular within the measurement window.

11 Claims, 1 Drawing Sheet

(51) Int. Cl.
*B60R 21/0136* (2006.01)
*B60W 30/09* (2012.01)
*B60W 30/095* (2012.01)

(52) U.S. Cl.
CPC .......... *B60W 30/0956* (2013.01); *H04W 4/40* (2018.02); *B60W 2756/10* (2020.02)

(56) References Cited

U.S. PATENT DOCUMENTS

2014/0000974 A1* 1/2014 Nilsson ................. B60R 21/015
 180/274
2016/0114798 A1* 4/2016 Kim ....................... G08G 1/166
 701/41
2016/0152208 A1* 6/2016 Ewert .................. B60R 21/0136
 701/46

FOREIGN PATENT DOCUMENTS

| DE | 102008007663 A1 | 8/2009 | |
| DE | 102013205361 A1 | 10/2014 | |
| DE | 102013212092 A1 | 1/2015 | |
| DE | 102015116276 A1 | 4/2016 | |
| DE | 102016210470 A1 | 12/2017 | |
| EP | 2679450 A1 | 1/2014 | |
| WO | WO-2014118178 A1 * | 8/2014 | ......... G06K 9/00791 |

* cited by examiner

DETECTION OF AN IMPACT EVENT

FIELD

The present invention relates to a method, a device, and also to a computer program and a storage medium for detecting an impact event.

BACKGROUND INFORMATION

Accidents, in particular damage to a vehicle, are generally detected by methods, which are based on the signals from contact sensor systems, in particular from acceleration, respectively pressure sensor systems of a vehicle safety system, for example, from a safety system of the passive (airbag system) or active safety (braking system, respectively vehicle stability control system).

Significant features in the signal characteristics are thereby evaluated in order to infer an accident and thus possible damage. Since accelerations from many environmental influences act on a vehicle, it is necessary that this approach be robustly configured in order to avoid incorrect deployments. This, in turn, makes it difficult to detect accidents that involve light damage.

Conventional systems can measure damage using sensors that are directly mounted on the vehicle body.

The additional expenditure entailed in such systems, such as the requisite cabling, for example, make such systems considerably more expensive.

SUMMARY

The present invention provides a method, a device, additionally a computer program and a storage medium for detecting an accident event (e.g., an impact event).

In accordance with the present invention, on the basis of sensor signals from a driving environment sensor system of the vehicle, a current model of the surroundings of a vehicle may be used to reliably detect an object critically approaching the vehicle.

On the basis of a determined contact probability, sensors, which function in response to the vehicle contacting an object (contact sensor system), may have a measurement window opened therefor, within which the otherwise robustly calculated detection thresholds are adapted to detect an impact event and associated damage by recording signals indicative thereof from the contact sensor system.

The present invention may make it possible for damage, in particular light damage caused by a vehicle operated in an at least partially automated manner during an at least partially automated drive, be detected and appropriately reacted to. Since it is possible in automated driving that the "driver" partly or completely turns away from the driving task, an impact event involving light damage may occur that is not perceived by the "driver." Thus, there is the risk of the vehicle moving away from the location of the impact event.

Light damage is understood here, inter alia, to be impact events in the low speed range (for example, speeds of less than 20 km/h), contacts with objects which are light or soft in comparison to a vehicle (for example, objects having a mass of less than 200 kg, respectively people), mirror contacts, i.e., touching the outside mirror, contacts with a guardrail, light contacts with sheet metal, in particular grazing.

A distinctive feature of light damage is that the energy input thereof to the vehicle is slight. The result is that inertial inputs, respectively pressure inputs, which are associated with an impact event that involves light damage, partly to completely play out below what is commonly known as the noise threshold.

When inertial inputs, respectively pressure inputs are recorded, a noise threshold is understood to be a threshold value below which inertial inputs, respectively pressure inputs are not evaluated. This is because inputs of this magnitude largely come from normal and accident-free use of the vehicle. Sources of such inputs are the interaction between tires and the roadway, in particular irregularities of the roadway, environmental inputs, in particular caused by wind and rain, inputs caused by microorganisms, for example, insects.

In this regard, in accordance with an example embodiment of the present invention, a method for a vehicle is provided here that includes the following steps:
a. developing a driving environment model for the vehicle based on first sensor signals from at least one driving environment sensor system of the vehicle;
b. using the driving environment model to determine a probability of contacting an object;
c. opening a measurement window for second signals of a contact sensor system as a function of the determined contact probability;
d. detecting an impact event as a function of the second sensor signals, in particular within the measurement window.

The example method of the present invention is especially suited for vehicles which are operated in an at least partially automated manner. This is because these vehicles are likely to be equipped with a driving environment sensor system that makes it possible for a highly accurate driving environment model to be developed.

A vehicle, which is operated in an at least partially automated manner, is a vehicle where the entire driving task or at least parts thereof are assumed by vehicle systems. If the entire driving task is assumed, this is referred to as a vehicle that is operated in a fully, respectively in a highly automated manner. The vehicle drives in an automated manner by autonomously detecting the routing of the road, other road users or obstacles, for example, and computing the appropriate control commands at least partially in the vehicle and routing them to the actuators in the vehicle, whereby the course of travel of the vehicle is specifically influenced accordingly. A human driver is not involved in the driving task in the case of a vehicle that is operated in a fully, respectively highly automated manner.

In the present case, a driving environment model is understood to be a mapping of the surroundings of the vehicle that may be derived from a fusion of the signals from the driving environment sensor system of the vehicle. Moreover, the driving environment model may be expanded by including information from other sources. These sources may be, inter alia, the inertial sensor system of the vehicle, vehicle-to-X communication or digital maps.

In the present case, a driving environment sensor system may be understood to be a sensor system of the vehicle that is suited for recording the surroundings of the vehicle. These include, inter alia, radar sensor systems, video sensor systems, ultrasonic sensor systems or lidar sensor systems.

A vehicle-to-X communication is understood to be a communication via vehicle-to-X communication means. In the case at hand, vehicle-to-X communication means are understood to be communication means used for a vehicle to communicate with other vehicles, respectively with the surroundings thereof. Suited for this are wireless communication means, such as radio, WLAN, GSM, LTE and the like, in particular in the embodiments thereof for the automotive sector.

In the present case, an inertial sensor system may be understood to be a sensor system of the vehicle that is suited for recording the forces acting on the vehicle. These include, inter alia, acceleration and rotation-rate sensor systems.

A contact sensor system may be understood here to be a sensor system of the vehicle that is suited for recording the vehicle making contact with an object, for example, with a second vehicle. Suited for this, inter alia, are inertial sensor systems, pressure sensor systems, force sensor systems or acoustic emission sensor systems.

A specific embodiment of the method of the present invention provides that the driving environment model be developed in the development step as a function of a fusion of first sensor signals from at least two driving environment sensor systems.

Fusing sensor signals from at least two driving environment sensor systems makes it possible to develop a most accurate possible model of the surroundings of the vehicle. The at least one other driving environment sensor technology may compensate for weaknesses (such as glare, poor visibility, poor weather conditions, strong reflection) of the one driving environment sensor technology.

A specific embodiment of the method of the present invention provides that the driving environment model include an inertial profile of the current driving situation. Furthermore, the inertial profile is developed in the development step as a function of third sensor signals from an inertial sensor system, and the impact event is detected in the detection step as a function of the inertial profile.

In the detection step, it is advantageous to use the inertial profile to filter the second signals in order to detect the impact event.

The developed inertial profile may be used to remove from the calculation, respectively more generally filter out a typical inertial profile of the current driving situation (caused, for example, by gravel, stone chips, asphalt, concrete slabs, etc.) in order to detect an impact event in the remaining sensor signals.

This specific embodiment makes it possible, in particular to detect light damage caused by the detected impact event.

A specific embodiment of the method of the present invention also provides that the driving environment model be developed in the development step as a function of information from a vehicle-to-X communication.

This specific embodiment makes it possible for current static and volatile, i.e., changing information on the surroundings to be used to develop the driving environment model.

The information from the vehicle-to-X communication may thereby include localization data, respectively geometric data on the object.

A specific embodiment of the method of the present invention provides that the contact probability also be determined in the determining step as a function of the information.

The localization data, respectively geometric data on the object makes it possible to more accurately determine the probability of a contact, therefore, of an impact event. This makes it possible for the relevant measurement window to be determined more accurately. This may help ensure a reduction in instances of erroneous detection (what are generally referred to as false-positive/false-negative results).

A specific embodiment of the method of the present invention provides that a threshold value for detecting the impact event be adapted in the step of opening the measurement window.

Threshold values may be used for detecting events, such as impact events, for example. Threshold values are useful for detecting an event, such as an impact event, for example, in particular in connection with sensor signals from contact sensor systems. The threshold values may thereby be static, i.e., predetermined in the vehicle application, for example, or variable, i.e., dependent on other current information. In addition, the threshold values may be rendered as time-dependent values.

The adaptation may thereby be implemented in such a way that the threshold value for detection of the impact event responds already to sensor signals from the contact sensor systems, although a threshold value for a noise threshold had not yet been exceeded. This may be achieved, in particular by lowering the threshold value for detection of the impact event.

In accordance with a specific embodiment of the method of the present invention, the method includes an additional localization step in which the accident event is localized as a function of the first sensor signals, respectively the second sensor signals, respectively of the third sensor signals.

Since the present invention is suited, in particular for detecting light damage and in connection with vehicles which are operated in an at least partially automated manner, not only does detection of an impact event, but also localization thereof take place on the vehicle. This simplifies the subsequent assessment of the damage and the associated loss, for example. This is especially helpful when the vehicle is operated in a fully, respectively highly automated manner, and possibly without a human driver, and an impact event occurs during such a drive.

A specific embodiment of the method of the present invention provides that the method include an additional plausibility-checking step by the impact event being checked for plausibility as a function of a diagnostic signal from a sensor of the vehicle.

In the present case, a diagnostic signal from a sensor may be understood to be a signal from the sensor that is output by the sensor itself and includes direct information about the status thereof (for example, intact, defective, etc.). This is likewise understood to be a signal which is output via the system in which the sensor is integrated and includes indirect information about the status of the sensor (for example, reachable, not reachable, failed, etc.).

Accordingly, a situation is possible where an impact event is probable, i.e., the measurement window is open, and where an impact event is detected via the sensor signals of the contact sensor system. If within a causal time interval thereto, a previously intact sensor outputs a diagnostic signal that identifies it as defective, then the information about this state change may be regarded as checking the plausibility of the ascertained impact event and possibly as a function of the localization of the impact event.

An alternative embodiment of the method provides that, in the detection step, sensor signals be evaluated from at least one sensor system that is able to detect an actual contact of the vehicle with an object, for example, with another vehicle.

Alternatively or additionally to the contact sensor system, microphones or ultrasonic sensors may be used as such a sensor system. Ultrasonic sensors, in particular, which are used in known methods heretofore on a vehicle in a system for parking assistance, respectively of the at least partially automated parking, may be set into a mode, for example, in which they do not emit an ultrasonic wave, rather record sound waves. The sound waves, respectively noises recorded in this manner may be evaluated to determine whether the recorded noises include the noises typical of an impact event.

In addition, to detect an impact event on the basis of sensor signals from microphones or ultrasonic sensors, the sensor signals of a plurality of sensors are recorded and mutually compared, respectively balanced to thereby determine and remove from the calculation, respectively more generally filter out ambient noises (for example, rain, wind, highway noises), which do not relate to the impact event. This embodiment results in a more accurate detection of the impact event and the damage associated therewith.

Furthermore, the impact event may be readily localized due to the spatial distribution of the sensor system provided primarily for a parking functionality of the vehicle.

Another aspect of the present invention is a machine-readable storage medium upon which the computer program according to the present invention is stored.

Another aspect of the present invention is an electronic control unit that is adapted to perform all steps of the method according to the present invention.

Specific embodiments of the present invention and details pertaining thereto are explained in greater detail below with reference to the figures.

DETAILED DESCRIPTION OF EXAMPLE EMBODIMENTS

Figure 1:
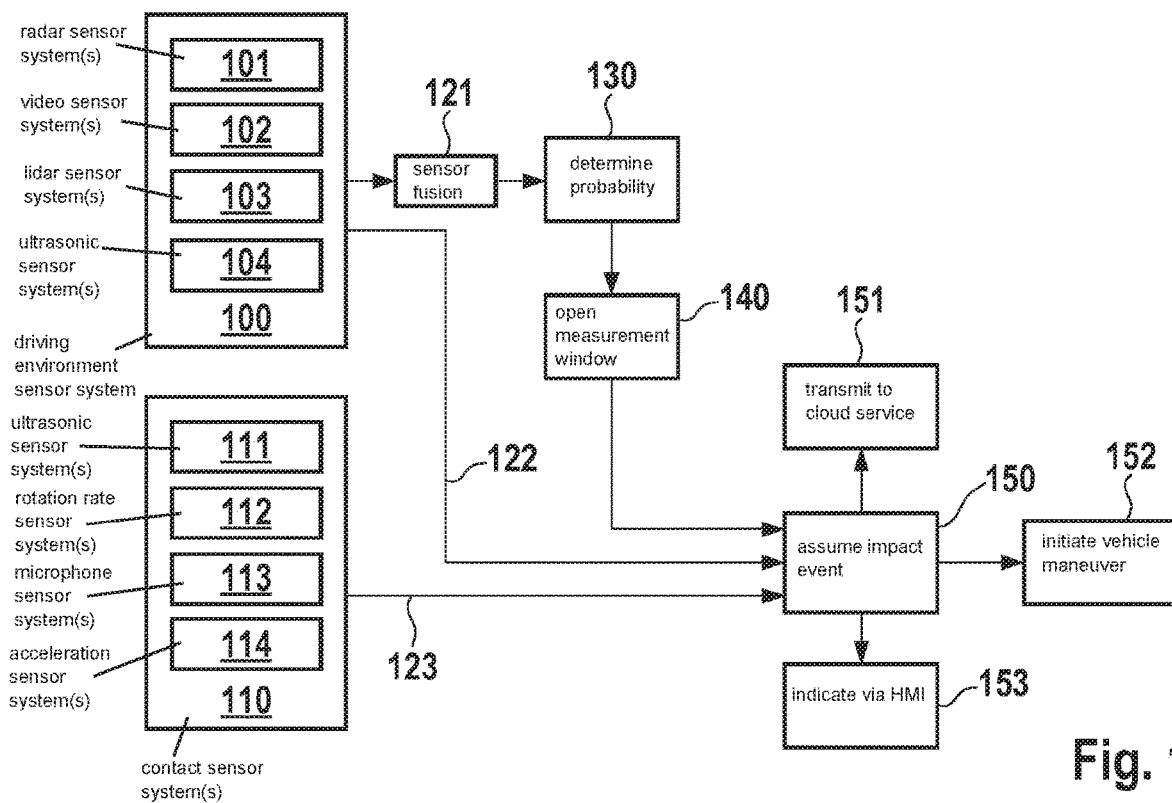
FIG. 1 is a block diagram of a system which realizes the method according to an example embodiment of the present invention.

FIG. 1 shows a block diagram of a system 1 which realizes the example method according to the present invention.

System 1 includes at least one driving environment sensor system 100. This may include, inter alia, radar sensor systems 101, video sensor systems 102, lidar sensor systems 103 or ultrasonic sensor systems 104.

A driving environment model is produced by a sensor fusion 121, inter alia, on the basis of sensor signals from driving environment sensor systems 100.

On the basis of the driving environment model, it is possible to determine a probability of the vehicle critically approaching 130 an object, respectively another vehicle.

In addition, the system includes contact sensor systems 110. These may include, inter alia, ultrasonic sensor systems 111, rotation-rate sensor systems 112, microphone sensor systems 113 or acceleration sensor systems 114. Acceleration sensor systems 114 and rotation-rate sensor systems 112 may be combined under the term inertial sensor systems.

If there is a high enough probability of a critical approach, a measurement window 140 may then be opened for contact sensor system 110. A predetermined threshold value may be used to determine whether there is a high enough probability. Also possible is a variable threshold value which is adapted, for example, on the basis of other information sources or a course of time.

Measurement window 140 for a contact sensor system 110 may thereby be opened in a way that adapts the robustly calculated threshold values for sensor signals of contact sensor system 123 to be more sensitive to contact inputs on the vehicle. This adaptation may be carried out, for example, by reducing the threshold values. This reduction may be predefined. Also possible is a variable reduction, for example, on the basis of other information sources or a course of time.

The reduction may thereby be implemented in such a way that the threshold value for detection of the impact event responds already to sensor signals from the contact sensor systems, although a threshold value for a noise threshold had not yet been exceeded.

Another possible information source could be status information 122 of driving environment sensor system 100, respectively of contact sensor system 110.

In the event of exceedance of the threshold values for the contact sensor system, an impact event 150 may be assumed. Such an impact event typically involves damage to the vehicle and to the other object, respectively the other vehicle.

As a consequence of a detected impact event, information thereon and possibly resulting damage may be transmitted to a cloud service 151.

It is also possible that vehicle maneuver 152 be initiated. A vehicle stop would be possible. In a simplest embodiment, such a stop may occur as an immediate stop. In the case of a vehicle which is controlled in an at least partially automated manner, such a vehicle stop may also be realized by the vehicle moving to a safe stop position, for example, a proper parking or emergency position.

It is also possible that the detected impact event and the possibly resulting damage be indicated 153 via an HMI (human machine interface) to the driver or the occupants of the vehicle, respectively to the entity in charge or, more generally, to the entity responsible for the vehicle.

Figure 2:
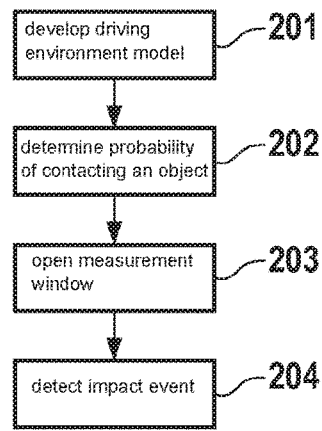
FIG. 2 is a flow chart of the example method according to the present invention.

FIG. 2 shows a flow chart of method 200 in accordance with the present invention.

In step 201, a driving environment model for the vehicle is developed as a function of first sensor signals from at least one driving environment sensor system of the vehicle.

In step 202, the driving environment model is used to determine a probability of contacting an object.

In step 203, a measurement window is opened for second signals of a contact sensor system as a function of the determined contact probability.

In step 204, an impact event is detected as a function of the second sensor signals, in particular within the measurement window.

Method 200 described above may be implemented in the vehicle by software for a computing unit, for example, for a control unit in the vehicle. It is also possible that method 200 be realized at least partially as an application-specific integrated circuit (ASIC). Furthermore, it is possible that parts of method 200 be implemented on different computing units in the vehicle and, if indicated, parts for computing units outside of the vehicle.

What is claimed is:

1. A method for detecting an impact event for a vehicle which is operated in an at least partially automated manner, the method comprising:
   a. producing, via a sensor fusion unit, a driving environment model for the vehicle as a function of first sensor signals from a plurality of driving environment sensor systems of the vehicle;
   b. using, via a computing unit, the driving environment model to determine a probability of contacting an object, including another vehicle;

c. opening, via the computing unit, a measurement window for second signals of a contact sensor system as a function of the determined contact probability, wherein when the determined contact probability is at least a specified probability, the measurement window is openable for the contact sensor system, and wherein the measurement window is opened so as to adapt predetermined or variable threshold values for the second signals of the contact sensor system;

d. detecting, via the computing unit, the impact event as a function of the second sensor signals, within the measurement window; and e. initiating a maneuver of the vehicle as a function of the determined contact probability;

wherein the plurality of driving environment sensor systems include: (i) a radar sensor system and/or a video sensor system, and (ii) an ultrasonic sensor system and/or a lidar sensor system, wherein the sensor fusion unit fuses data from each of the systems of the plurality of driving environment sensor systems, wherein the contact sensor system includes an ultrasonic sensor system, a rotation-rate sensor system, a microphone sensor system, an acceleration sensor system, and/or an inertial sensor system, and wherein the measurement window for the contact sensor system is opened so as to adapt calculated threshold values for the sensor signals of the contact sensor system to be more sensitive to contact inputs on the vehicle, wherein the adapting is carried out by reducing the threshold values, wherein the reduction is predefined or is a variable reduction based on other information sources or a course of time, so that the reduction is implemented so that the threshold value for detection of the impact event responds to the sensor signals from the contact sensor systems, even though a threshold value for a noise threshold has not been exceeded.

2. The method as recited in claim 1, wherein the driving environment model is produced as a function of a fusion of the first sensor signals from at least two driving environment sensor systems.

3. The method as recited in claim 1, wherein the driving environment model includes an inertial profile of a current driving situation, and, in the producing step, the inertial profile is produced as a function of third sensor signals from an inertial sensor system, and, in the detection step, the impact event is also detected as a function of the inertial profile.

4. The method as recited in claim 3, wherein the second signals are filtered by the inertial profile in the detection step to detect the impact event.

5. The method as recited in claim 3, further comprising: localizing the impact event as a function of the first sensor signals, the second sensor signals, or the third sensor signals.

6. The method as recited in claim 1, wherein the driving environment model is produced in the producing step as a function of information from a vehicle-to-X communication, the information including localization data and geometric data on the object.

7. The method as recited in claim 6, wherein the contact probability is determined in the producing step as a function of the information.

8. The method as recited in claim 1, wherein a threshold value for detecting the impact event is adapted in the opening step.

9. The method as recited in claim 1, further comprising: checking a plausibility of the detection of the impact event as a function of a diagnostic signal of a sensor of the vehicle.

10. A non-transitory machine-readable storage medium, on which is stored a computer program, which is executable by a processor of a computing unit, comprising:
a program code arrangement having program code for detecting an impact event for a vehicle which is operated in an at least partially automated manner, the computer program, by performing the following:

a. producing, via a sensor fusion unit, a driving environment model for the vehicle as a function of first sensor signals from a plurality of driving environment sensor systems of the vehicle;

b. using, via a computing unit, the driving environment model to determine a probability of contacting an object, including another vehicle;

c. opening, via the computing unit, a measurement window for second signals of a contact sensor system as a function of the determined contact probability, wherein when the determined contact probability is at least a specified probability, the measurement window is openable for the contact sensor system, and wherein the measurement window is opened so as to adapt predetermined or variable threshold values for the second signals of the contact sensor system;

d. detecting, via the computing unit, the impact event as a function of the second sensor signals, within the measurement window; and e. initiating a maneuver of the vehicle as a function of the determined contact probability;

wherein the plurality of driving environment sensor systems include: (i) a radar sensor system and/or a video sensor system, and (ii) an ultrasonic sensor system and/or a lidar sensor system, wherein the sensor fusion unit fuses data from each of the systems of the plurality of driving environment sensor systems, wherein the contact sensor system includes an ultrasonic sensor system, a rotation-rate sensor system, a microphone sensor system, an acceleration sensor system, and/or an inertial sensor system, and wherein the measurement window for the contact sensor system is opened so as to adapt calculated threshold values for the sensor signals of the contact sensor system to be more sensitive to contact inputs on the vehicle, wherein the adapting is carried out by reducing the threshold values, wherein the reduction is predefined or is a variable reduction based on other information sources or a course of time, so that the reduction is implemented so that the threshold value for detection of the impact event responds to the sensor signals from the contact sensor systems, even though a threshold value for a noise threshold has not been exceeded.

11. An electronic control apparatus to detect an impact event for a vehicle which is operated in an at least partially automated manner, comprising:
an electronic control unit configured to perform the following:

a. producing, via a sensor fusion unit, a driving environment model for the vehicle as a function of first sensor signals from a plurality of driving environment sensor systems of the vehicle;

b. using, via a computing unit, the driving environment model to determine a probability of contacting an object, including another vehicle;
c. opening, via the computing unit, a measurement window for second signals of a contact sensor system as a function of the determined contact probability, wherein when the determined contact probability is at least a specified probability, the measurement window is openable for the contact sensor system, and wherein the measurement window is opened so as to adapt predetermined or variable threshold values for the second signals of the contact sensor system;
d. detecting, via the computing unit, the impact event as a function of the second sensor signals, within the measurement window; and
e. initiating a maneuver of the vehicle as a function of the determined contact probability;
wherein the plurality of driving environment sensor systems include: (i) a radar sensor system and/or a video sensor system, and (ii) an ultrasonic sensor system and/or a lidar sensor system, and
wherein the sensor fusion unit fuses data from each of the systems of the plurality of driving environment sensor systems,
wherein the contact sensor system includes an ultrasonic sensor system, a rotation-rate sensor system, a microphone sensor system, an acceleration sensor system, and/or an inertial sensor system, and
wherein the measurement window for the contact sensor system is opened so as to adapt calculated threshold values for the sensor signals of the contact sensor system to be more sensitive to contact inputs on the vehicle, wherein the adapting is carried out by reducing the threshold values, wherein the reduction is predefined or is a variable reduction based on other information sources or a course of time, so that the reduction is implemented so that the threshold value for detection of the impact event responds to the sensor signals from the contact sensor systems, even though a threshold value for a noise threshold has not been exceeded.

* * * * *